US012586818B2

(12) United States Patent
Hong et al.

(10) Patent No.: US 12,586,818 B2

(45) Date of Patent: Mar. 24, 2026

(54) DEXTRIN-DADMAC BASED DOUBLE NETWORK POLYMER GEL ELECTROLYTE, METHOD FOR PREPARING THE SAME AND ENERGY STORAGE DEVICE INCLUDING THE SAME

(71) Applicant: RESEARCH & BUSINESS FOUNDATION SUNGKYUNKWAN UNIVERSITY, Suwon-si (KR)

(72) Inventors: Jungwoo Hong, Seoul (KR); Hoseok Park, Yongin-si (KR); Jeong Hee Park, Seoul (KR); Harpalsinh Hardevsinh Rana, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 583 days.

(21) Appl. No.: 18/071,929

(22) Filed: Nov. 30, 2022

(65) Prior Publication Data

US 2023/0170525 A1 Jun. 1, 2023

(30) Foreign Application Priority Data

Nov. 30, 2021 (KR) ........................ 10-2021-0167876

(51) Int. Cl.
*H01M 10/0565* (2010.01)

(52) U.S. Cl.
CPC .................. *H01M 10/0565* (2013.01); *H01M 2300/0082* (2013.01); *H01M 2300/0085* (2013.01)

(58) Field of Classification Search
CPC ............. H01M 10/05; H01M 10/0565; H01M 2300/0082; H01M 2300/0085; H01G 11/56; H01G 11/58; Y02E 60/10
See application file for complete search history.

(56) References Cited

U.S. PATENT DOCUMENTS

2021/0013533 A1* 1/2021 Fedorovich ......... H01M 8/1039
2022/0059888 A1* 2/2022 Iwata .................... H01M 12/06

FOREIGN PATENT DOCUMENTS

CN 110534696 A * 12/2019 .......... H01M 4/8878
KR 102026621 B1 * 9/2019 ........ H01M 10/0565

OTHER PUBLICATIONS

Machine translation of Korean Patent Publication No. 102026621B1, published on Sep. 30, 2019. (Year: 2019).*

(Continued)

*Primary Examiner* — Miriam Stagg
*Assistant Examiner* — Lilia Nedialkova
(74) *Attorney, Agent, or Firm* — LEX IP MEISTER, PLLC

(57) ABSTRACT

A dextrin-DADMAC based double network polymer gel electrolyte is disclosed. The gel electrolyte includes: a first polymer network having a network structure in which linear main chains including diallyldimethylammonium chloride (DADMAC) monomers are crosslinked with each other via N,N-methylenebisacrylamide; a second polymer network including a dextrin polymer chain, and entangled with the first polymer network to form a double network composed of the first and second polymer networks; and a liquid electrolyte supported inside the double network composed of the first and second polymer networks. In addition, mechanical properties of the polymer gel electrolyte are improved via an ion exchange reaction between the polymer gel electrolyte and a salt.

16 Claims, 17 Drawing Sheets

(56) References Cited

OTHER PUBLICATIONS

Pont, A.-L. et al. "Pyrrolidinium-based polymeric ionic liquids as mechanically and electrochemically stable polymer electrolytes", Journal of Power Sources, 188, pp. 558-563, published Dec. 6, 2008. (Year: 2008).*

Devi, G.N., et al. "Synthesis and characterization of dextrin-based polymer electrolytes for potential applications in energy storage devices", Ionics, 23, pp. 3377-3388, published May 21, 2017. (Year: 2017).*

Amici, J. et al. "PEEK-WC/Nanosponge membranes for lithium-anode protection in rechargeable Li—O2 batteries", ChemElectroChem, 12, pp. 1599-1605, published Apr. 10, 2018. (Year: 2018).*

Wu, H. et al. "Tough gel electrolyte using double polymer network design for the safe, stable cycling of lithium metal anode", Agewandte Chemie, 57, pp. 1361-1365, published Dec. 16, 2017. (Year: 2017).*

Liang, L. et al. "Highly Conductive, flexible, and nonflammable double-network poly(ionic liquid)-based ionogel electrolyte for flexible lithium-ion batteries", ACS Applied Materials and Interfaces, 13, pp. 25410-25420, published May 19, 2021. (Year: 2021).*

Hong, J.W., et al. "High Na—ion conductivity and mechanical integrity of anion-exchanged polymeric hydrogel electrolytes for flexible sodium ion hybrid energy storage", SusMat, 4, pp. 140-153, published Jan. 22, 2024. (Year: 2024).*

Machine translation of Chinese Patent Publication No. 110534696A, published on Dec. 3, 2019. (Year: 2019).*

* cited by examiner

DEXTRIN-DADMAC BASED DOUBLE NETWORK POLYMER GEL ELECTROLYTE, METHOD FOR PREPARING THE SAME AND ENERGY STORAGE DEVICE INCLUDING THE SAME

CROSS-REFERENCE TO RELATED APPLICATIONS

This application claims priority from Korean Patent Application No. 10-2021-0167876 filed on Nov. 30, 2021, in the Korean Intellectual Property Office, and all the benefits accruing therefrom under 35 U.S.C. 119, the contents of which in its entirety are herein incorporated by reference.

BACKGROUND

Field

The present disclosure relates to a polymer gel electrolyte that may be applied to an energy storage device, a method for preparing the same, and an energy storage device including the same.

Description of Related Art

Recently, as IoT and ICT technologies are in the spotlight, the importance of next-generation flexible or wearable electronic devices is emerging. In terms of performance and stability, deformation of an energy storage system is becoming the biggest technical challenges.

In order to overcome the stability and leakage problems of liquid electrolytes, all-solid-state or semi-solid electrolytes have been studied a lot recently. Conventionally used materials have limitations in simultaneously satisfying electrochemical, mechanical, and thermal properties required in the electrolyte for a flexible energy storage device. In addition, the conventional flexible energy storage device using the all-solid or semi-solid electrolyte in which the stability problem has been solved operates so as to exhibit excellent performance under general room temperature conditions, but undergoes electrolyte decomposition and instability of a separator under extreme conditions such as high temperature, resulting in performance limitations. Thus, solving this problem becomes a great challenge.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a dextrin-DADMAC based double network polymer gel electrolyte with excellent elasticity and robustness.

Another purpose of the present disclosure is to provide a method for preparing the polymer gel electrolyte.

Still another purpose of the present disclosure is to provide an energy storage device including the polymer gel electrolyte.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

A first aspect of the present disclosure provides gel electrolyte comprising: a first polymer network having a network structure in which linear main chains including diallyldimethylammonium chloride (DADMAC) monomers of a following Chemical Formula 1 are cross-linked with each other via N,N-methylenebisacrylamide of a following Chemical Formula 2; a second polymer network including a dextrin polymer chain, and entangled with the first polymer network to form a double network composed of the first and second polymer networks; and a liquid electrolyte supported inside the double network composed of the first and second polymer networks:

[Chemical Formula 1]

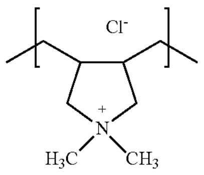

[Chemical Formula 2]

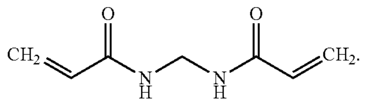

In the gel electrolyte according to an embodiment of the present disclosure, an ion exchange reaction between the first polymer having a network structure in which the linear main chains including diallyldimethylammonium chloride (DADMAC) monomers of the following Chemical Formula 1 are a cross-linked with each other via N,N-methylenebisacrylamide and an anion ($ClO4^-$, $BF4^-$) of a salt occurs, thereby improving mechanical properties of the gel electrolyte.

In the gel electrolyte according to an embodiment of the present disclosure, an ether group of the second polymer chain including the dextrin entangled with the first polymer network to form a double network may obtain improve ionic conductivity of the gel electrolyte.

In the gel electrolyte according to an embodiment of the present disclosure, the double network may be impregnated with $NaClO_4$ water in salt electrolyte such that excellent ionic conductivity properties of the gel electrolyte may be maintained at a low temperature of −30 C.

In one implementation of the gel electrolyte, the first polymer network includes a polymer network of a following Chemical Formula 3:

[Chemical Formula 3]

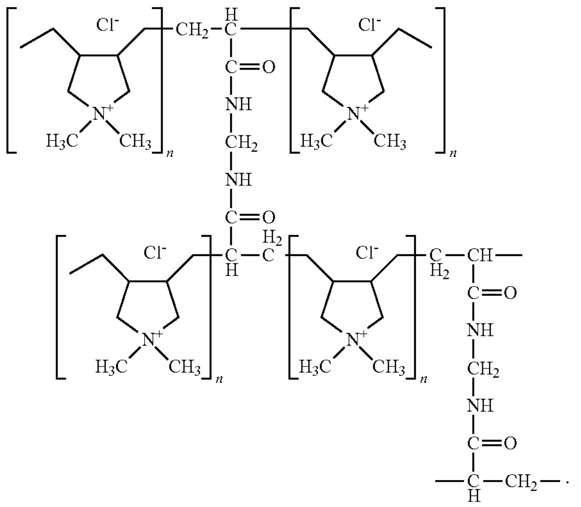

In one implementation of the gel electrolyte, the first polymer network has a number average molecular weight of about 7000 to 600000 Da.

In one implementation of the gel electrolyte, the dextrin polymer chain has a number average molecular weight of about 15000 to 30000 Da.

In one implementation of the gel electrolyte, a content of the second polymer network is in a range of about 1 to 15% by weight, based on a total weight of the first polymer network.

In one implementation of the gel electrolyte, a chain length of the second polymer network is larger than a chain length of the first polymer network.

A second aspect of the present disclosure provides a method for preparing gel electrolyte, the method comprising: a first step of adding N,N-methylenebisacrylamide as a crosslinking agent and an initiator to) an aqueous solution containing diallyldimethylammonium chloride (DADMAC) monomers to perform a radical reaction between some of the diallyldimethylammonium chloride monomers and a portion of the N,N-methylenebisacrylamide; and a second step of adding a dextrin polymer chain to the aqueous solution and then performing a radical reaction between a remainder of the diallyldimethylammonium chloride monomers and a remainder of the N,N-methylenebisacrylamide.

In one implementation of the method, in the first step, the diallyldimethylammonium chloride monomers are added at a content of about 100 to 110 mol, based on 1 mol of the N,N-methylenebisacrylamide.

In one implementation of the method, in the first step, a portion of a first polymer network having a network structure in which linear main chains formed via polymerization of some of the diallyldimethylammonium chloride monomers are crosslinked with each other via the portion of the N,N-methylenebisacrylamide is obtained.

In one implementation of the method, in the second step, the dextrin polymer chain is added to the aqueous solution at a content of about 1 to 15% by weight, based on a weight of the first polymer network.

In one implementation of the method, in the second step, in a process of mixing the portion of the first polymer network obtained in the first step with the dextrin polymer chain, an additional radical reaction between the remainder of the diallyldimethylammonium chloride monomers and the remainder of the N,N-methylenebisacrylamide occurs such that the dextrin polymer chain and the first polymer network are entangled with each other to form a double network.

In one implementation of the method, the radical reaction is carried out at a temperature of about 80 to 100° C.

In one implementation of the method, the method further comprises: a third step of applying a reaction solution including a double network polymer resulting from the second step in a form of a film and then drying the applied reaction solution in the form of the film; and a fourth step of swelling a dried double network polymer in a form of a film using water to remove unreacted diallyldimethylammonium chloride monomers and unreacted N,N-methylenebisacrylamide as the crosslinking agent.

In one implementation of the method, the method further comprises a fifth step of impregnating the dried double network polymer in the form of the film with an aqueous solution containing a salt such that an ion exchange reaction between the salt and the double network polymer occurs to improve mechanical properties of the gel electrolyte.

In one implementation of the gel electrolyte, the gel electrolyte may include an electrolyte system obtained by impregnating the double network with an aqueous solution of lithium and sodium salts (X—$ClO_4$) and (X—$BF_4$) to perform an anion exchange reaction therebetween, and then impregnating the double network with water in salt 15M $NaClO_4$ electrolyte.

A third aspect of the present disclosure provides an energy storage device comprising: a first electrode and a second electrode facing each other and spaced from each other; and gel electrolyte disposed between the first electrode and the second electrode, wherein the gel electrolyte includes the gel electrolyte as described above.

In one implementation of the device, the energy storage device includes a supercapacitor or a secondary battery.

According to the dextrin-DADMAC based double network polymer gel electrolyte of the present disclosure and the method for preparing the same, the relatively rigid first polymer network and the relatively soft second polymer network constitute the double network. Thus, elasticity and rigidity of the polymer gel electrolyte may be remarkably improved. As a result, an amount of volume change caused by osmotic pressure due to a change in the concentration of the salt may be reduced, and a phenomenon in which mechanical strength is weakened due to volume expansion may be prevented.

Further, since both the first and second polymer networks have very strong hygroscopicity, the dextrin-DADMAC based double network polymer gel electrolyte has excellent wettability. As a result, when the dextrin-DADMAC based double network polymer gel electrolyte is swollen using an aqueous solvent, the gel electrolyte absorbs the solvent, such that the volume thereof expands such that the gel electrolyte has a high porous structure, and thus may have a high ionic conductivity of about $2\times10^{-2}$ S/cm.

In the dextrin-DADMAC based double network polymer gel electrolyte of the present disclosure, a film-type double network polymer is prepared and is impregnated with lithium and sodium salt (X—$ClO_4$), (X—$BF_4$) aqueous solution to conduct an anion exchange reaction therebetween. Thus, the ion-exchanged anions may bind to the polymers in a hydrogen-bond manner. Thus, the dextrin-DADMAC based double network polymer gel electrolyte may have high mechanical properties of about 0.7 MPa.

In addition, the double network is impregnated with an aqueous solution of lithium and sodium salt (X—$ClO_4$) and ($X—BF_4$) to conduct an anion exchange reaction therebetween and then is impregnated with water in salt 15M $NaClO_4$ electrolyte to improve cryogenic ionic conductivity of the dextrin-DADMAC based double network polymer gel electrolyte.

Further, the first polymer network includes the diallyldimethylammonium chloride monomers as an ionic material, and thus has high wettability with an organic solvent. As a result, the dextrin-DADMAC based double network polymer gel electrolyte may also be used as organic gel electrolyte.

Further, the dextrin-DADMAC based double network polymer gel electrolyte of the present disclosure has a low production cost, has superior flame retardancy to that of each of conventional PP and PE based separators, and has excellent ionic conductivity. In addition, the dextrin polymer chain and the diallyldimethylammonium chloride polymer chain are non-toxic materials that are not harmful to the human body, and are biodegradable, and thus are eco-friendly materials that may prevent environmental pollution.

In addition to the effects as described above, specific effects in accordance with the present disclosure will be described together with following detailed descriptions for carrying out the disclosure.

DETAILED DESCRIPTIONS

Figure 1:
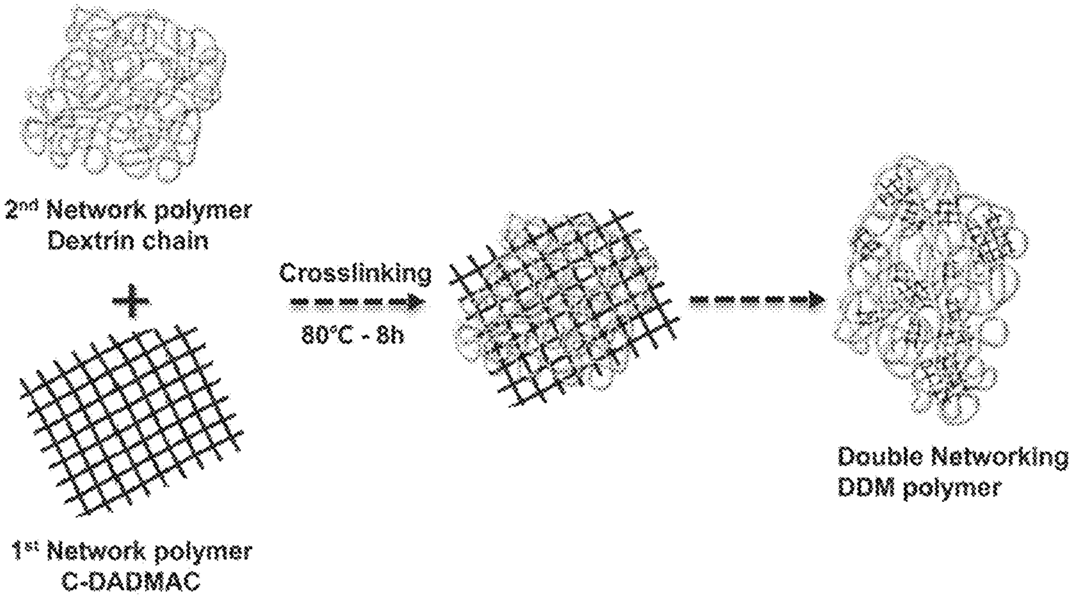
FIG. 1 is a diagram for illustrating a dextrin-DADMAC based double network polymer gel electrolyte according to an embodiment of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, and components have not been described in detail so as not to unnecessarily obscure aspects of the present disclosure.

The terminology used herein is for the purpose of describing particular embodiments only and is not intended to limit the present disclosure. As used herein, the singular forms “a” and “an” are intended to include the plural forms as well, unless the context clearly indicates otherwise. It will be further understood that the terms “comprise”, “comprising”, “include”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of the associated listed items. Expression such as “at least one of” when preceding a list of elements may modify an entirety of list of elements and may not modify the individual elements of the list. When referring to “C to D”, this means C inclusive to D inclusive unless otherwise specified.

It will be understood that, although the terms “first”, “second”, “third”, and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "substantially," "about," and similar terms are used as terms of approximation and not as terms of degree, and are intended to account for the inherent deviations in measured or calculated values that would be recognized by those of ordinary skill in the art. The term may be used to prevent unauthorized exploitation by an unauthorized infringer to design around accurate or absolute figures provided to help understand the present disclosure.

Figure 2:
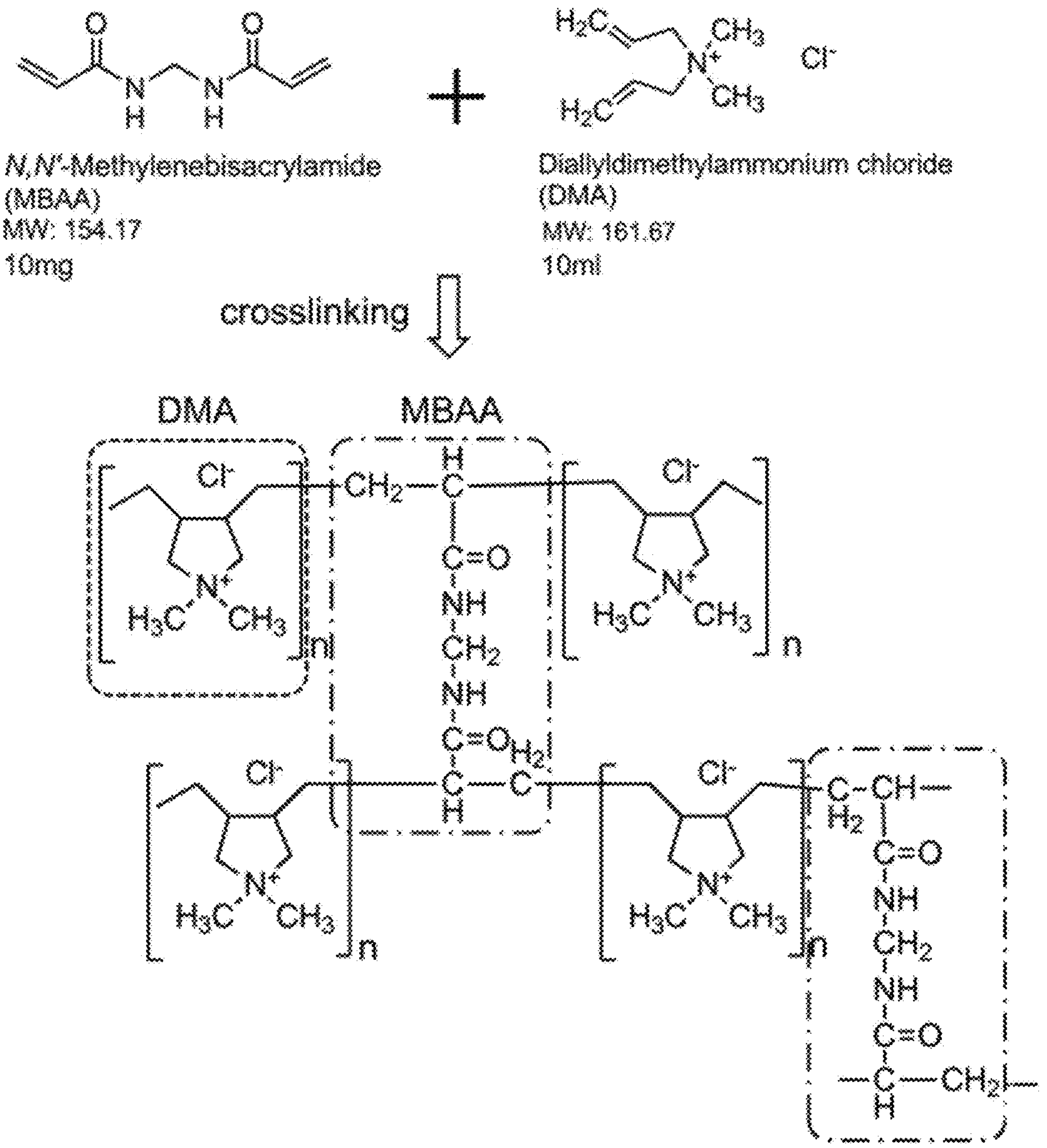
FIG. 2 is a diagram for illustrating a method of f synthesizing a diallyldimethylammonium chloride (DADMAC)/N, N'-methylenebisacrylamide (MBAA) network as one embodiment of a first polymer network shown in FIG. 1.

FIG. 1 is a diagram for illustrating a dextrin-DADMAC based double network polymer gel electrolyte according to an embodiment of the present disclosure. FIG. 2 is a diagram for illustrating a method of synthesizing a diallyldimethylammonium chloride (DADMAC)/N,N'-methylenebisacrylamide (MBAA) network as one embodiment of a first polymer network shown in FIG. 1.

Referring to FIG. 1 and FIG. 2, the dextrin-DADMAC based double network polymer gel electrolyte according to an embodiment of the present disclosure includes a first polymer network, a second polymer network, and liquid electrolyte. The first polymer network and the second polymer network may be mixed with each other to form a double network structure. The liquid electrolyte may be supported or carried inside the double network structure of the first and second polymer networks.

The first polymer network may have a network structure in which linear main chains including diallyldimethylammonium chloride (DADMAC) monomers of a following Chemical Formula 1 are cross-linked with each other via N,N-methylenebisacrylamide (MBAA). In one embodiment, the first polymer network may have a network structure of a following Chemical Formula 3. In the following Chemical Formula 3, n may be an integer from about 30 to 40000, for example, from about 53 to 3464. For example, the first polymer network of the following Chemical Formula 3 may have a number average molecular weight of about 7000 Da to 600000 Da, for example, about 8500 Da to 560000 Da.

[Chemical Formula 1]

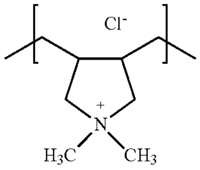

[Chemical Formula 2]

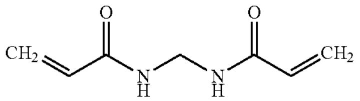

[Chemical Formula 3]

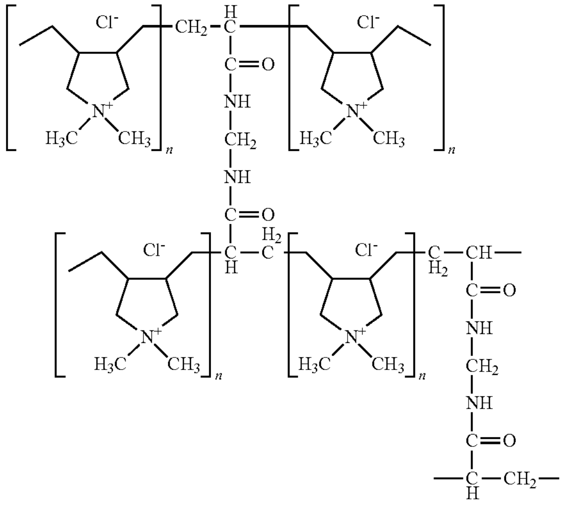

The second polymer network may include a dextrin polymer chain. The dextrin polymer chain may be entangled with the first polymer network to form a double network of the first and second polymer networks. In one embodiment, the second polymer network may include a compound of a following Chemical Formula 4.

[Chemical Formula 4]

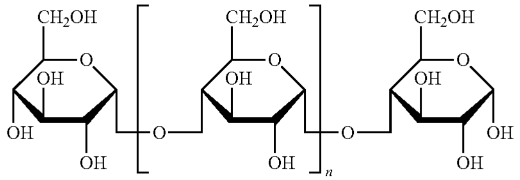

In the above Chemical Formula 4, n may be an integer of about 10 to 100, for example, about 30 to 40. For example, a compound of the Chemical Formula 4 may have a number average molecular weight of about 15000 to 30000 Da, for example, about 17140 to 22850 Da.

In one embodiment, in the dextrin-DADMAC based double network polymer gel electrolyte, a content of the second polymer network may be in a range of about 1 to 15% by weight, for example, about 2 to 4% by weight, based on a total weight of the first polymer network.

The liquid electrolyte may be supported or carried in the double network structure composed of the first and second polymer networks.

In one embodiment, the liquid electrolyte may include an ionic liquid, an organic electrolyte, an aqueous electrolyte, and the like. The ionic liquid may include a known material without limitation. For example, the ionic liquid may include one selected from BIMI:$BF_4$, EMIM:TFSI and EMIM:$BF_4$, as imidazolium-based ionic liquids. The organic electrolyte may include a known organic electrolyte without limitation. For example, the organic electrolyte may include an organic solvent and a salt dissolved therein such as $LiBF_4$, $LiClO_4$, $LiPF_6$, $LiAsF_6$, $LiCF_3SO_3$, $LiN(SO_2CF_3)_2$, $LiN(SO_2C_2F_5)_2$, $LiC(SO_2CF_3)_2$, $LiB(C_2H_5)_4$, $NaBF_4$, $NaClO_4$, $NaPF_6$, $NaAsF_6$, $NaCF_3SO_3$, $NaN(SO_2CF_3)_2$, $NaN(SO_2C_2F_5)_2$, $NaC(SO_2CF_3)_2$, $NaB(C_2H_5)_4$, etc. The aqueous electrolyte may include a known aqueous electrolyte without limitation. For example, the aqueous electrolyte may include an aqueous solution such as sulfuric acid, phosphoric acid, potassium hydroxide, and the like. The aqueous electrolyte may include an aqueous solvent and a salt dissolved therein such as $LiBF_4$, $LiClO_4$, $LiPF_6$, $LiAsF_6$, $LiCF_3SO_3$, $LiN(SO_2CF_3)_2$, $LiN(SO_2C_2F_5)_2$, $LiC(SO_2CF_3)_2$, $LiB(C_2H_5)_4$, $NaBF_4$, $NaClO_4$, $NaPF_6$, $NaAsF_6$, $NaCF_3SO_3$, $NaN(SO_2CF_3)_2$, $NaN(SO_2C_2F_5)_2$, $NaC(SO_2CF_3)_2$, $NaB(C_2H_5)_4$, etc.

Figure 3:
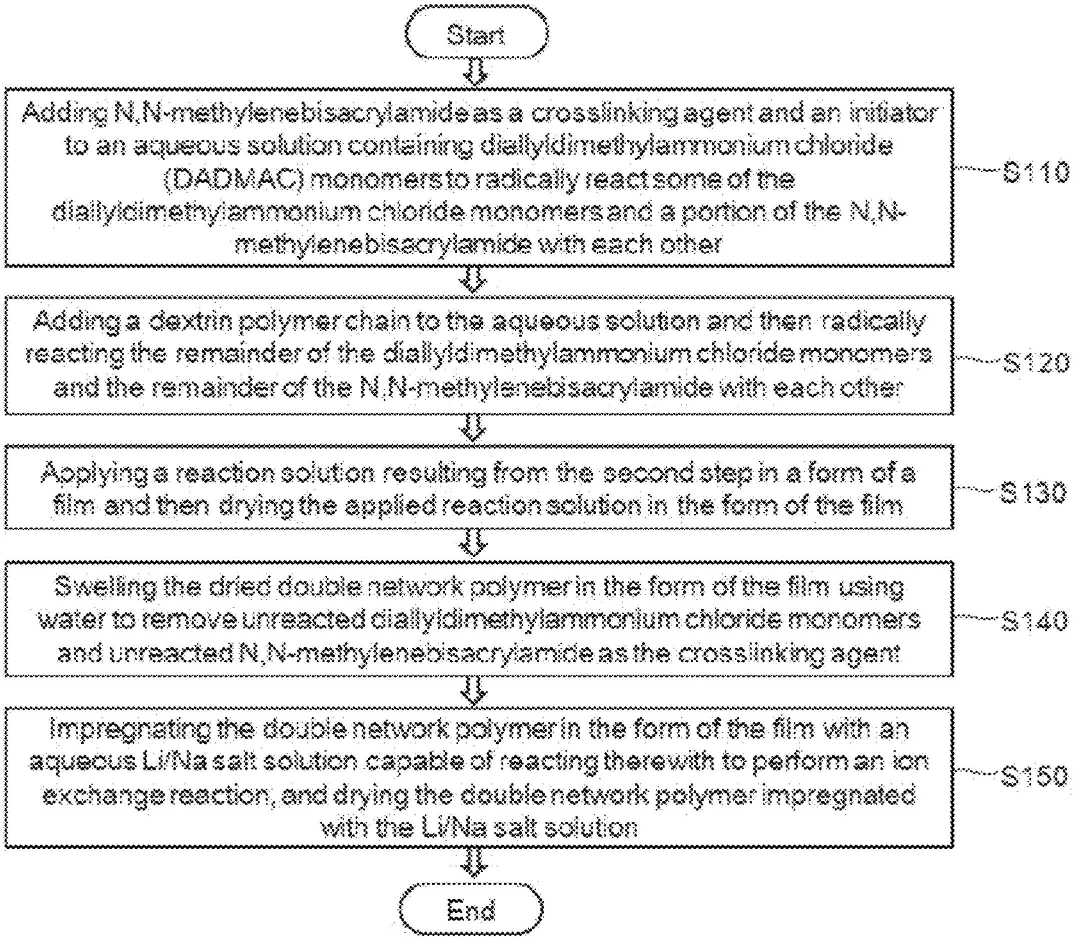
FIG. 3 is a flowchart for illustrating a method for preparing a dextrin-DADMAC based double network polymer gel electrolyte according to an embodiment of the present disclosure.

FIG. 3 is a flowchart for illustrating a method for preparing a dextrin-DADMAC based double network polymer gel electrolyte according to an embodiment of the present disclosure.

Referring to FIG. 3 together with FIG. 1 and FIG. 2, the method of preparing the dextrin-DADMAC based double network polymer gel electrolyte according to an embodiment of the present disclosure may include a first step S110 of adding N,N-methylenebisacrylamide as a crosslinking agent and an initiator to an aqueous solution containing diallyldimethylammonium chloride (DADMAC) monomers to radically react some of the diallyldimethylammonium chloride monomers and a portion of the N,N-methylenebisacrylamide with each other, and a second step S120 of adding a dextrin polymer chain to the aqueous solution and then radically reacting the remainder of the diallyldimethylammonium chloride monomers and the remainder of the N,N-methylenebisacrylamide with each other.

In the first step S110, a portion of the first polymer network having a network structure may be formed in which the linear main chains formed via polymerization of some of the diallyldimethylammonium chloride monomers are crosslinked with each other via a portion of the N,N-methylenebisacrylamide.

In one embodiment, the diallyldimethylammonium chloride monomers may be added in an amount of about 100 to 110 mol, for example, about 106 to 107 mol, based on 1 mol of the N,N-methylenebisacrylamide.

In one embodiment, the initiator may include a radical polymerization initiator. For example, the initiator may include at least one selected from potassium peroxosulfate (KPS), 2,2-azobisisobutyronitrile (AIBN), benzoyl peroxide (BPO), and the like.

In one embodiment, one or more salt compounds selected from $NaClO_4$, NaCl, $Na_2SO_4$, $NaNO_3$, $Li_2SO_4$, LiTFSI, etc. may be additionally added to the aqueous solution. The radical reaction may be performed after the addition of the salt compound.

In one embodiment, the first step may be performed at a temperature of about 80 to 100° C.

In the second step S210, in a process of mixing a portion of the first polymer network formed in the first step S110 and the dextrin polymer chain with each other, the remainder of the diallyldimethylammonium chloride monomers and the remainder of the N,N-methylenebisacrylamide may be subjected to an additional radical reaction, so that the dextrin polymer chain and the first polymer network are entangled with each other to form the double network.

In one embodiment, the dextrin polymer chain may be added to the aqueous solution at a content of about 1 to 15% by weight, for example, about 2 to 4% by weight, based on a weight of the first polymer network.

In one embodiment, the radical reaction between the remainder of the diallyldimethylammonium chloride monomers and the remainder of the N,N-methylenebisacrylamide may be performed at a temperature of about 80 to 100° C.

In one embodiment of the present disclosure, the method for preparing the dextrin-DADMAC based double network polymer gel electrolyte may further include a third step S130 of applying a reaction solution resulting from the second step in a form of a film and then drying the applied reaction solution in the form of the film; a fourth step S140 of swelling the dried double network polymer in the form of the film using water to remove unreacted diallyldimethylammonium chloride monomers and unreacted N,N-methylenebisacrylamide as the crosslinking agent; and a fifth step S150 of impregnating the double network polymer in the form of the film from which the impurities are removed with an aqueous Li/Na salt solution capable of reacting therewith to perform an ion exchange reaction, and drying the double network polymer impregnated with the Li/Na salt solution.

In one embodiment, one or more salt compounds selected from $NaClO_4$, NaCl, $Na_2SO_4$, $NaNO_3$, $NaBF_4$, $Na_2SO_4$, NaTFSI, $LiClO_4$, LiCl, $Li_2SO_4$, $LiNO_3$, $LiBF_4$, $Li_2SO_4$, LiTFSI, etc. may be additionally added to the aqueous solution. The radical reaction may be carried out after the addition of the salt compound.

According to the dextrin-DADMAC based double network polymer gel electrolyte of the present disclosure and the method for preparing the same, the relatively rigid first polymer network and the relatively soft second polymer network constitute the double network. Thus, elasticity and rigidity of the polymer gel electrolyte may be remarkably improved. As a result, an amount of volume change caused by osmotic pressure due to a change in the concentration of the salt may be reduced, and a phenomenon in which mechanical strength is weakened due to volume expansion may be prevented. Hydrogen bonds between the first polymer and the anions of the salt are achieved via the ion exchange reaction thereof with the salt dissolved in the electrolyte, thereby remarkably improving the rigidity of the first polymer. Thus, the mechanical properties of the dextrin-DADMAC based double network polymer gel electrolyte may be comparable to that of the all-solid electrolyte. Thus, the volume change of the polymer gel electrolyte caused by the strong hygroscopicity of the first and second polymer networks may be reduced to prevent a phenomenon in which the mechanical strength is weakened due to the volume expansion.

Further, since both the first and second polymer networks have very strong hygroscopicity, the dextrin-DADMAC based double network polymer gel electrolyte has excellent wettability. As a result, when the dextrin-DADMAC based double network polymer gel electrolyte is swollen using an aqueous solvent, the gel electrolyte absorbs the solvent, such that the volume thereof expands such that the gel electrolyte has a high porous structure, and thus may have a high ionic conductivity of about $2\times10^{-2}$ S/cm.

In the dextrin-DADMAC based double network polymer gel electrolyte of the present disclosure, a film-type double network polymer is prepared and is impregnated with lithium and sodium salt ($X—ClO_4$), ($X—BF_4$) aqueous solution to conduct an anion exchange reaction therebetween. Thus, the ion-exchanged anions may bind to the polymers in a hydrogen-bond manner. Thus, the dextrin-DADMAC based double network polymer gel electrolyte may have high mechanical properties of about 0.7 MPa.

In addition, the double network is impregnated with an aqueous solution of lithium and sodium salt ($X—ClO_4$) and ($X—BF_4$) to conduct an anion exchange reaction therebetween and then is impregnated with water in salt 15M $NaClO_4$ electrolyte to improve cryogenic ionic conductivity of the dextrin-DADMAC based double network polymer gel electrolyte.

Further, the first polymer network includes the diallyldimethylammonium chloride monomers as an ionic material, and thus has high wettability with an organic solvent. As a result, the dextrin-DADMAC based double network polymer gel electrolyte may also be used as organic gel electrolyte.

Further, the dextrin-DADMAC based double network polymer gel electrolyte of the present disclosure has a low production cost, has superior flame retardancy to that of each of conventional PP and PE based separators, and has excellent ionic conductivity. In addition, the dextrin polymer chain and the diallyldimethylammonium chloride polymer chain are non-toxic materials that are not harmful to the human body, and are biodegradable, and thus are eco-friendly materials that may prevent environmental pollution.

The gel electrolyte according to an embodiment of the present disclosure may be applied to an energy storage device. In one embodiment, the energy storage device may include a first electrode and a second electrode disposed so as to face each other and spaced apart from each other, and gel electrolyte disposed between the first electrode and the second electrode, wherein the gel electrolyte may include the gel electrolyte according to the present disclosure as described with reference to FIG. 1 and FIG. 2.

The energy storage device may be embodied as, for example, a supercapacitor or a lithium secondary battery.

In an embodiment, when the energy storage device is embodied as a supercapacitor, each of the first and second electrodes may be made of a carbon-based material. For example, each of the first and second electrodes may be made of carbon nanotubes, graphene, or the like. In this regard, the gel electrolyte may include the first polymer network, the second polymer network, and the liquid electrolyte.

In another embodiment, when the energy storage device is embodied as a lithium secondary battery, one of the first and second electrodes may act as a positive electrode structure of the lithium secondary battery, and the other thereof may act as a negative electrode structure of the lithium secondary battery. Each of the positive electrode structure and the negative electrode structure may include a known lithium secondary battery electrode structure without limitation. In this regard, the gel electrolyte may include the first polymer network, the second polymer network, and the liquid electrolyte.

Hereinafter, specific Examples and experimental examples according to the present disclosure will be described in detail. However, the following Examples are only some embodiments of the present disclosure. The scope of the present disclosure is not limited to the following Examples.

[Example]: Preparing Dextrin-DADMAC-Based Double Network Polymer Gel Electrolyte MBAA as the crosslinking agent and KPS as the initiator were dissolved in a DADMAC 60 wt % aqueous solution. Then, the mixed solution was heated to 80 to 100° C. such that a radical polymerization reaction was carried out. In this regard, $Li_2SO_4$ salt necessary for the electrolyte was added to the solution, and then the polymerization was initiated. After 3 minutes from initiation of the radical reaction, dextrin powders were added thereto, and then an additional radical reaction was performed for 2 minutes.

Then, the resulting product in a form of a liquid with high viscosity rather than in a form of a gel was poured onto a glass plate to form a separator thin film thereon. Then, the thin film was placed in a synthesis oven at 70° C. and was heated therein for 8 hours.

Then, the dextrin-DADMAC based double-crosslinked polymer separator prepared by the above process was dried and was wetted with an aqueous solution obtained by dissolving a salt in distilled water at a concentration of 1M, such that the separator film was swollen for 1 hour. This swelling process was repeated successively three times using a new aqueous solution to remove unreacted substances.

Then, the dextrin-DADMAC based double-crosslinked polymer separator prepared by the above process was wetted with an aqueous solution obtained by dissolving a salt in a distilled water at a concentration of 1M to 15M such that the polymer separator was swollen to conduct an ion exchange reaction therebetween for 10 minutes to increase mechanical properties of the polymer separator.

Then, the polymer separator was dried in vacuum for 8 hours, and was impregnated with a liquid electrolyte in which a salt was dissolved. Thus, the gel electrolyte was prepared.

[Experimental Example 1]: Evaluation of Electrochemical Performance of Dextrin-DADMAC-Based Double Network Polymer Gel Electrolyte FIG. 4 is a graph showing a result of measuring the impedance (EIS) of the dextrin-DADMAC based double network polymer gel electrolyte prepared according to Example.

Figure 4:
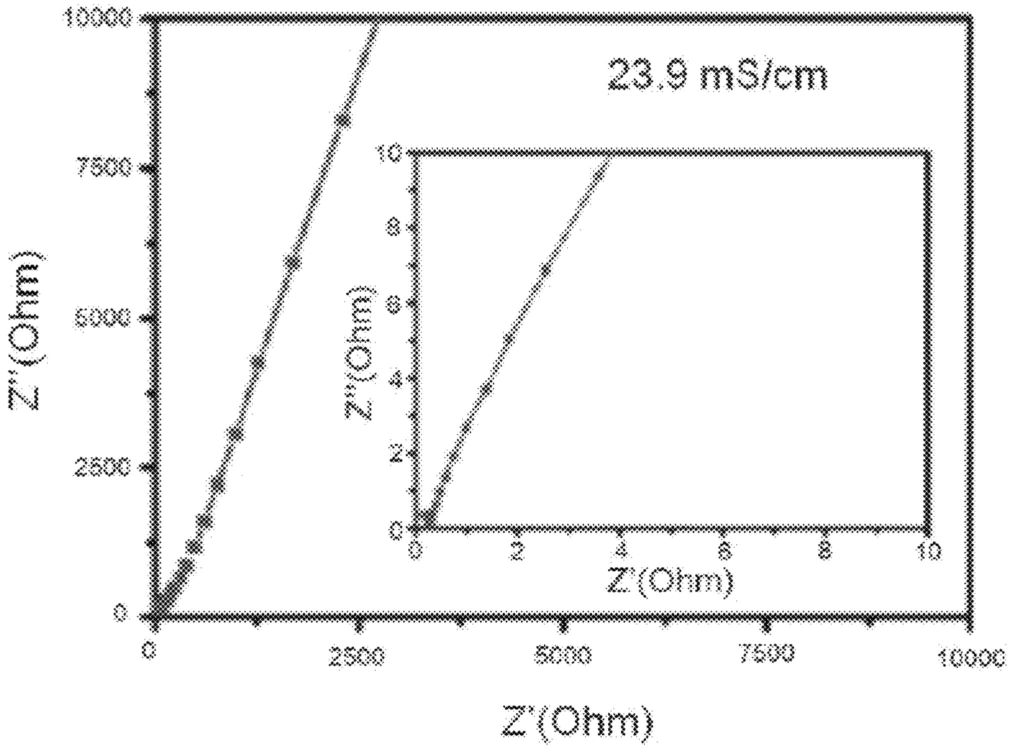
FIG. 4 is a graph showing a result of measuring an impedance (EIS) of the dextrin-DADMAC based double network polymer gel electrolyte prepared according to Example.

Referring to FIG. 4, it may be identified that the dextrin-DADMAC based double network polymer gel electrolyte prepared according to Example has very low resistance and very good ionic conductivity of about 23.9 mS/cm.

Figure 5:
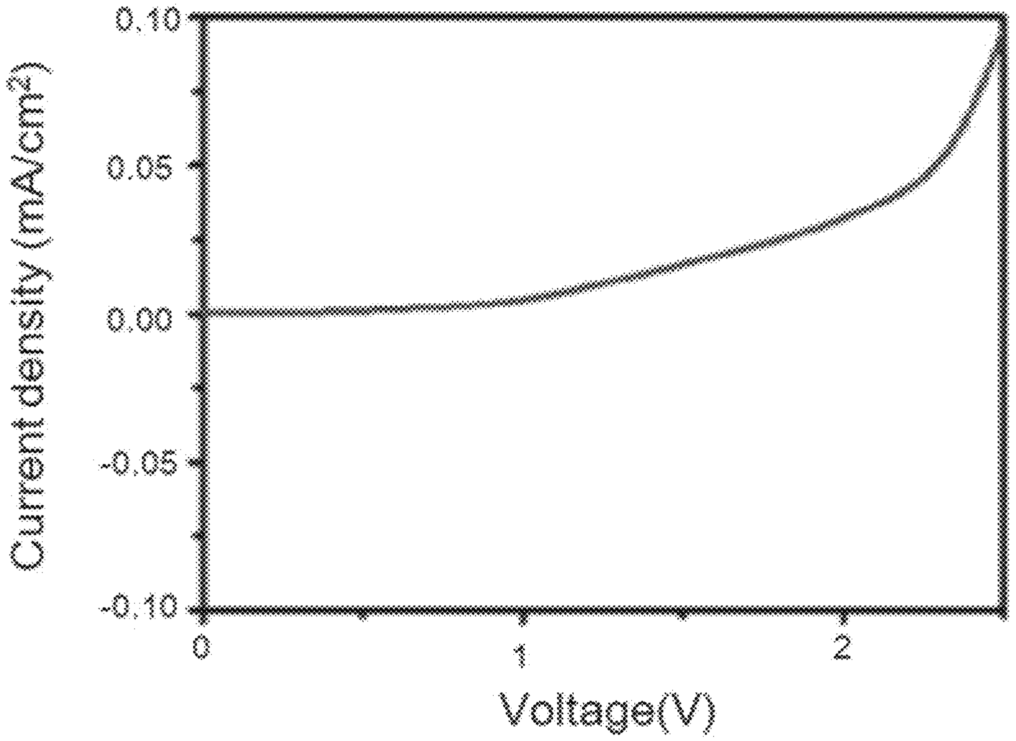
FIG. 5 is a graph showing a result of measuring a LSV of the dextrin-DADMAC based double network polymer gel electrolyte prepared according to Example.

FIG. 5 is a graph showing a result of measuring a LSV of the dextrin-DADMAC based double network polymer gel electrolyte prepared according to Example.

Referring to FIG. 5, it may be identified that in an aqueous solution containing sodium salt, the dextrin-DADMAC based double network polymer gel electrolyte prepared according to Example delivers current at a current density of 0.10 mA $cm^{-2}$ at a voltage of 2.50 V. That is, it may be identified that the dextrin-DADMAC based double network polymer gel electrolyte prepared according to Example has a potential window of 2.5V or greater, and exhibits excellent electrochemical stability.

Figure 6A:
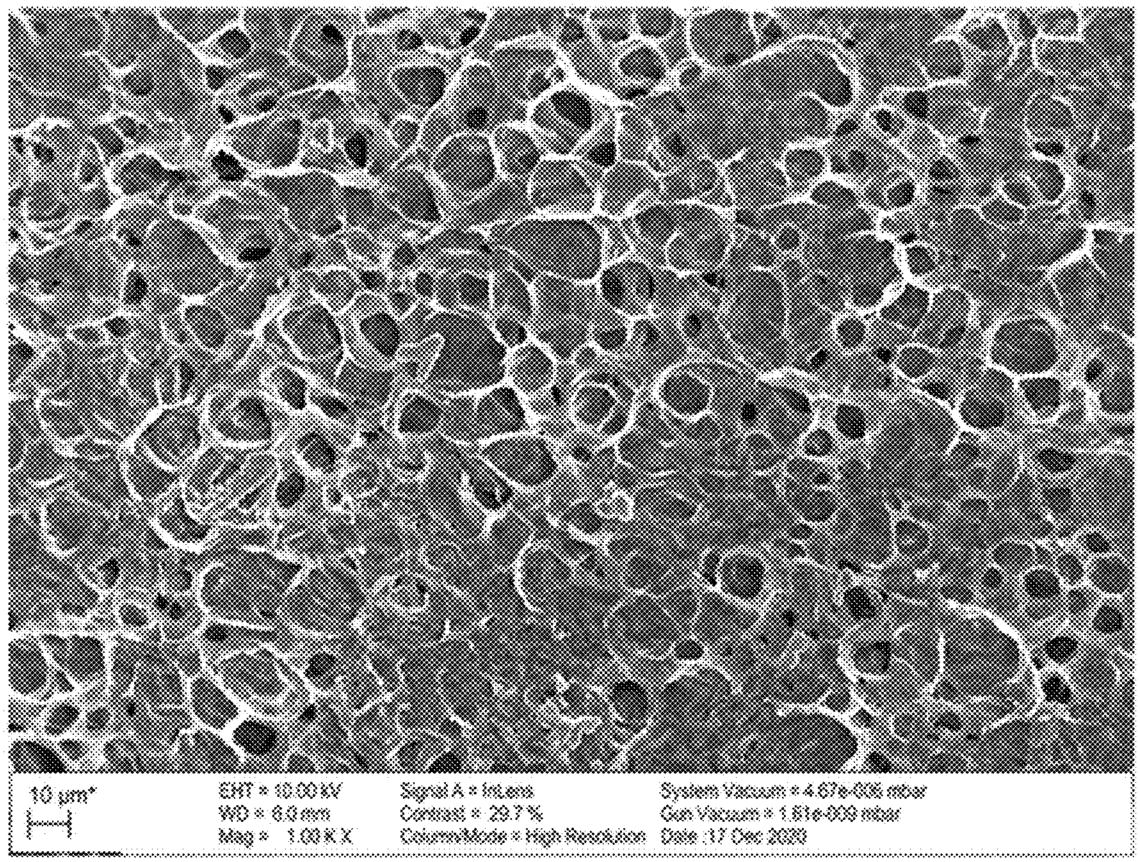
FIG. 6A and FIG. 6B are SEM images of a swollen state of the dextrin-DADMAC based double network polymer gel electrolyte prepared according to Example.
Figure 6B:
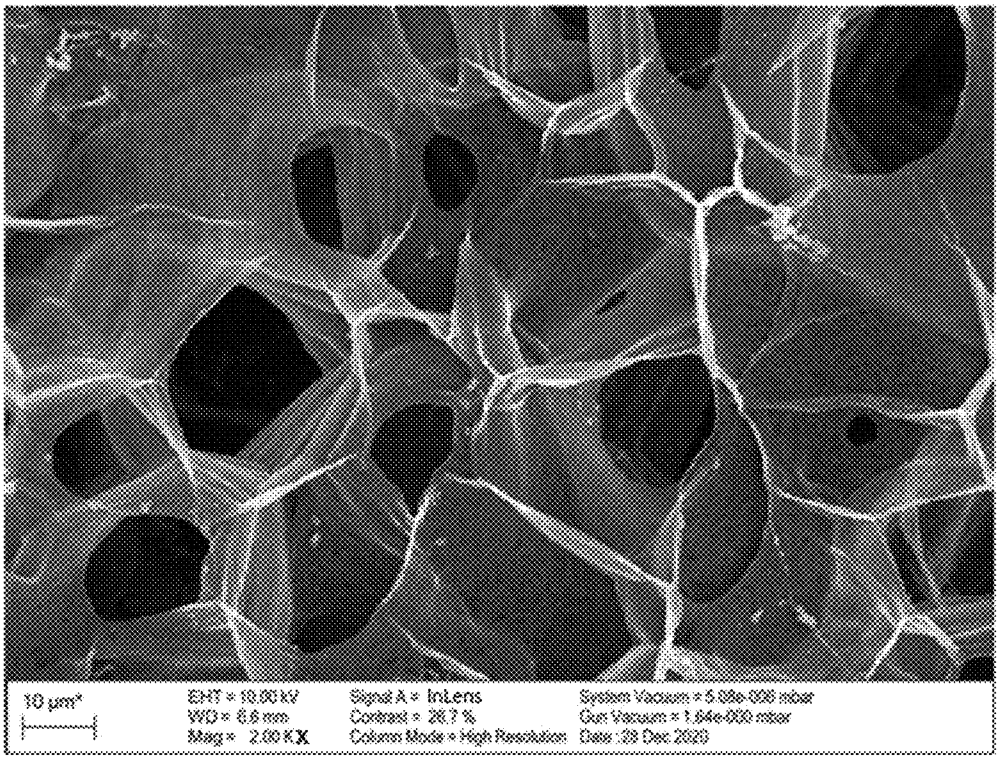

FIG. 6A and FIG. 6B are SEM images of a swollen state of the dextrin-DADMAC based double network polymer gel electrolyte prepared according to Example.

Referring to FIG. 6A and FIG. 6B, it may be identified that when the dextrin-DADMAC based double network polymer gel electrolyte prepared according to Example is swollen, the polymer gel electrolyte has a three-dimensional porous structure. Thus, it may be identified that due to this structure, the dextrin-DADMAC based double network polymer gel electrolyte prepared according to Example has good wettability.

Figure 7A:
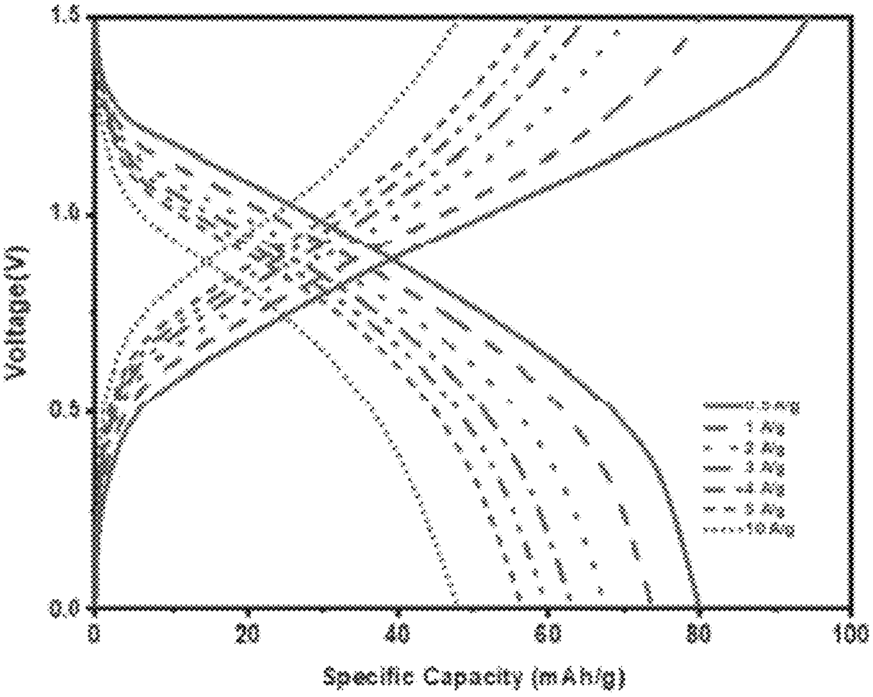
FIG. 7A and FIG. 7B are graphs showing results of GCD measurements of batteries including aqueous and organic electrolytes containing $NaClO_4$ salt, respectively.
Figure 7B:
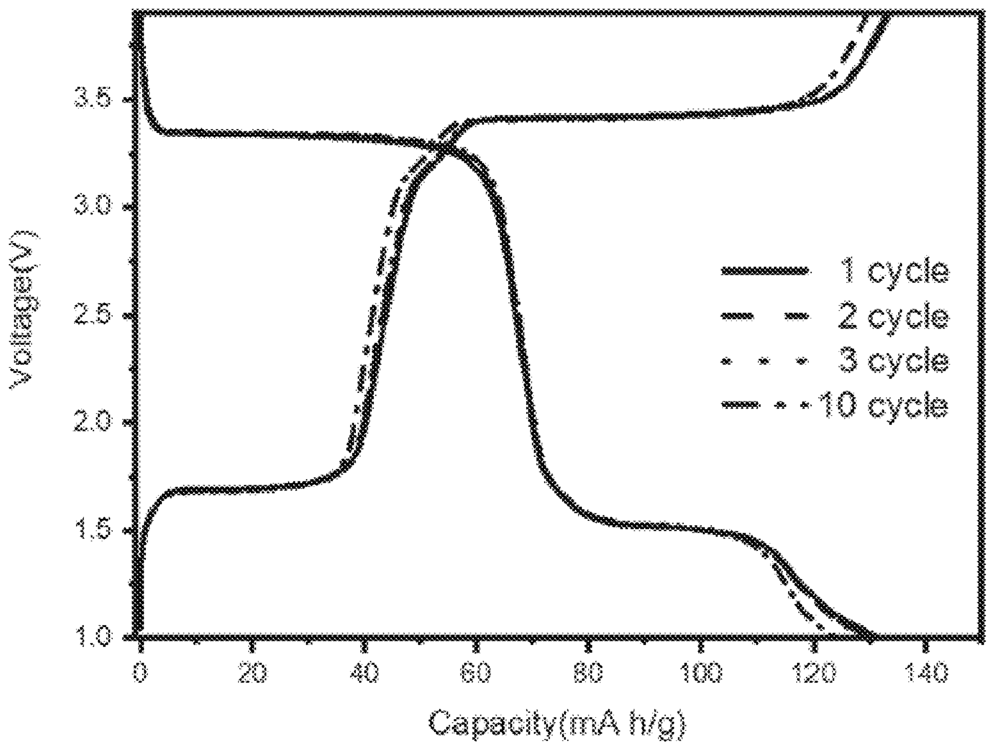

FIG. 7A and FIG. 7B are graphs showing results of GCD (galvanostatic charge/discharge) measurements of batteries including aqueous and organic electrolytes containing $NaClO_4$ salt, respectively.

Referring to FIG. 7A and FIG. 7B, the battery including the dextrin-DADMAC based double network polymer gel electrolyte prepared according to Example as the aqueous electrolyte exhibits the capacity which is superior to that of each of other hybrid batteries, and exbibits the performance of 90 mA h/g. The battery including the dextrin-DADMAC based double network polymer gel electrolyte prepared according to Example as the organic electrolyte using an organic solvent at EC:DMC 1:1 (wt:wt) ratio exhibits the capacity which is almost the same as the theoretical capacity and exhibits the capacity performance of 125 mA h/g. The battery including the dextrin-DADMAC based double network polymer gel electrolyte prepared according to Example as the aqueous electrolyte exhibits excellent capacity and performance of 80 to 48 mA h/g as measured at a high rate capability of 0.5 to 10 A/g. The battery including the dextrin-DADMAC based double network polymer gel electrolyte prepared according to Example as the aqueous electrolyte exhibits an excellent capacity of about 73 mA h/g at a rate capability of 1 A/g which is 10 times faster than a rate capability of 0.1 A/g as a measurement capability rate of the battery including the dextrin-DADMAC based double network polymer gel electrolyte prepared according to Example as the organic electrolyte.

Figure 8:
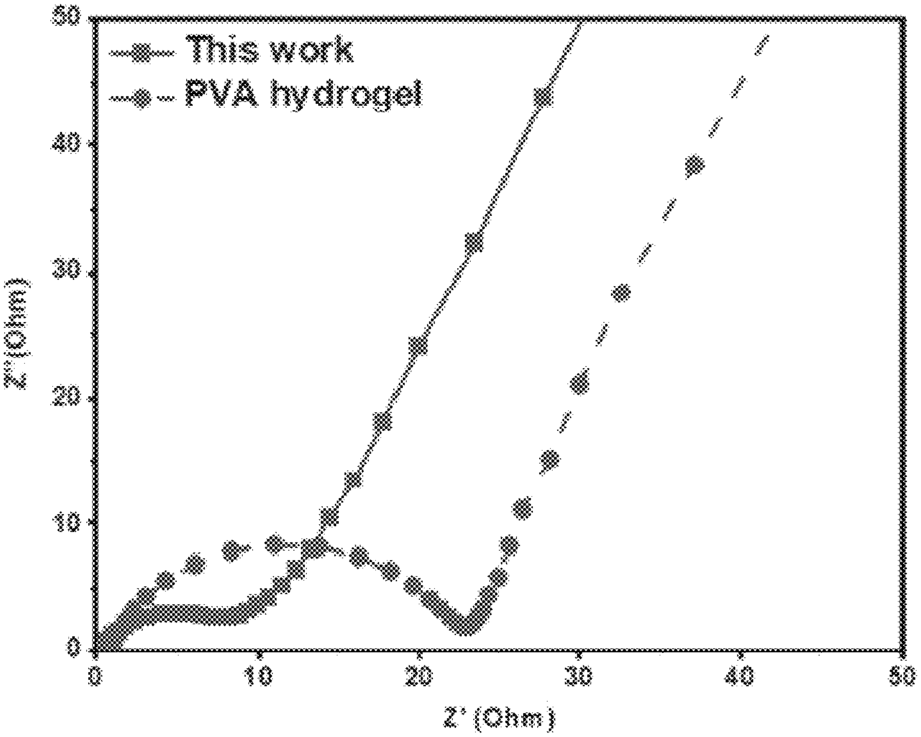
FIG. 8 is a graph showing comparison between impedance (EIS) measurement results of the dextrin-DADMAC based double network polymer gel electrolyte prepared according to Example and PVA gel electrolyte.

FIG. 8 is a graph showing comparison between impedance (EIS) measurement results of the dextrin-DADMAC based double network polymer gel electrolyte prepared according to Example and PVA gel electrolyte.

Referring to FIG. 8, the dextrin-DADMAC based double network polymer gel electrolyte prepared according to Example including an aqueous solvent exhibits better charge transfer resistance (total cell resistance) than that of the PVA hybrid gel. The charge transfer resistance of the dextrin-DADMAC based double network polymer gel electrolyte is 6 ohms.

Figure 9:
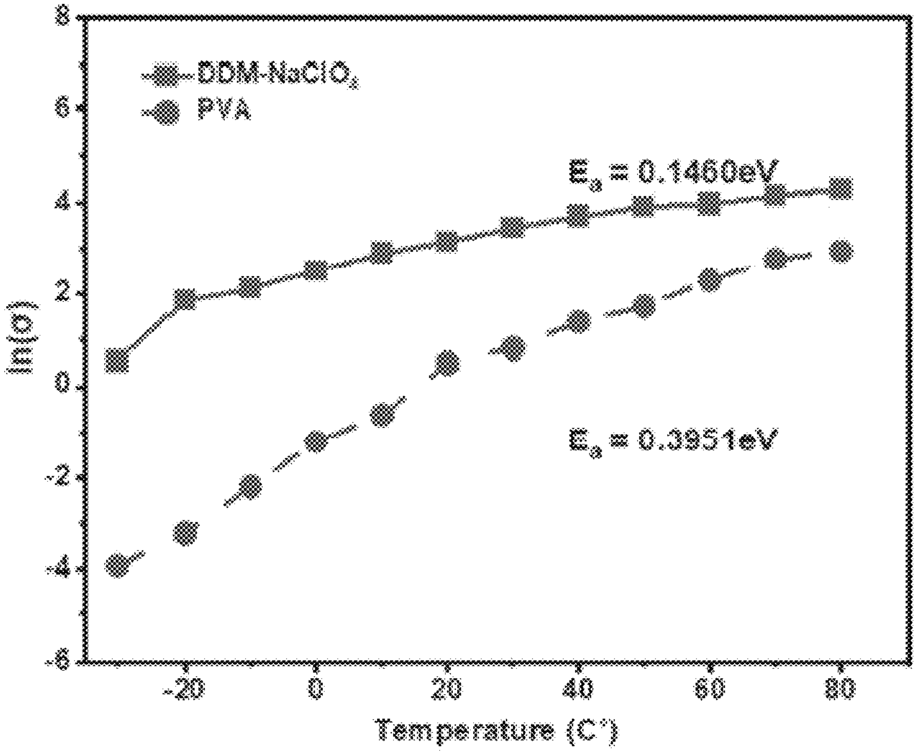
FIG. 9 is a graph showing a result of measuring an ionic conductivity of each of the dextrin-DADMAC based double network polymer gel electrolyte prepared according to Example and PVA gel electrolyte in a temperature range from −30 to +80 degrees C.

FIG. 9 is a graph showing a result of measuring an ionic conductivity of each of the dextrin-DADMAC based double network polymer gel electrolyte prepared according to Example and PVA gel electrolyte in a temperature range from −30 to +80 degrees C. That is, FIG. 9 is a graph showing a result of measuring the ionic conductivity based on the temperature of each of the dextrin-DADMAC based double network polymer gel electrolyte prepared according to Example and the PVA polymer gel electrolyte.

Referring to FIG. 9, the dextrin-DADMAC based double network polymer gel electrolyte prepared according to Example using an aqueous solvent exhibits better ionic conductivity than that of the PVA hybrid gel electrolyte in the temperature range from −30 C.° to +80 C.°. Further, the dextrin-DADMAC based double network polymer gel electrolyte prepared according to Example using an aqueous solvent exhibits better ionic conductivity than that of the PVA gel electrolyte even at −30 C.°.

Figure 10A:
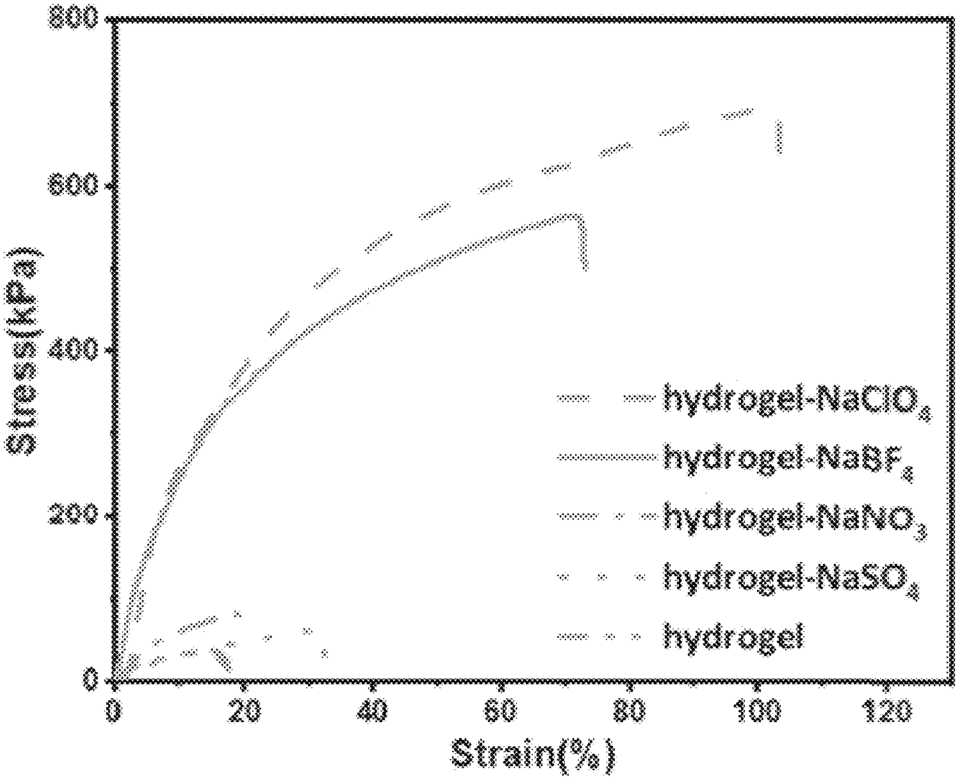
FIG. 10A and FIG. 10B show graphs measuring mechanical properties (stiffness and ductility) based on a Stress-Strain Curve of the dextrin-DADMAC based double network polymer gel electrolyte prepared according to Example, wherein the polymer gel electrolyte is prepared via impregnating with an aqueous sodium salt solution having each of different anions (FIG. 10A) and via changing a composition of a dextrin polymer chain as a second polymer (FIG. 10B) and is subjected to an ion exchange reaction.
Figure 10B:
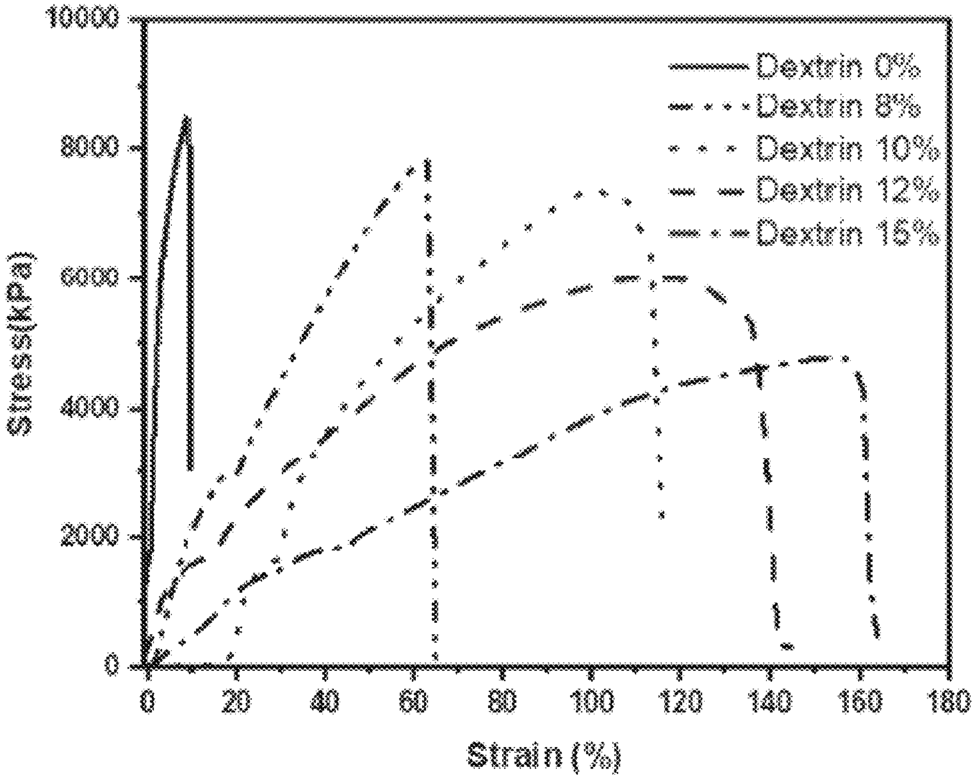

FIG. 10A and FIG. 10B show graphs measuring mechanical properties (stiffness and ductility) based on a Stress-Strain Curve of the dextrin-DADMAC based double network polymer gel electrolyte prepared according to Example, wherein the polymer gel electrolyte is prepared via impregnating with an aqueous sodium salt solution having each of different anions (FIG. 10A) and via changing a composition of a dextrin polymer chain as a second polymer (FIG. 10B) and is subjected to an ion exchange reaction.

FIG. 10A is a graph measuring mechanical properties (stiffness and ductility) based on a Stress-Strain Curve of the dextrin-DADMAC based double network polymer gel electrolyte prepared according to Example, wherein the polymer gel electrolyte is prepared via impregnating with an aqueous sodium salt solution having each of different anions and is subjected to an ion exchange reaction. As a result, the mechanical properties of the gel electrolyte after the ion exchange reaction are improved compared to the gel electrolyte before the ion exchange. The gel that is subjected to an ion exchange reaction of each of $ClO_4$ and $BF_4$ anions exhibits excellent mechanical properties of each of about 7000 kPa and 5500 kPa.

FIG. 10B show a graph measuring mechanical properties (stiffness and ductility) based on a Stress-Strain Curve of the dextrin-DADMAC based double network polymer gel electrolyte prepared according to Example, wherein the polymer gel electrolyte is prepared via changing a composition of a dextrin polymer chain as a second polymer and is subjected to an ion exchange reaction. Referring to FIG. 10B, the gel electrolyte which contains 8 to 10% of the dextrin polymer chain as the second polymer exhibits excellent rigidity and ductility, and exhibits performance of about 7000 to 8000 kPa and ductility of about 65 to 120%.

Figure 11:
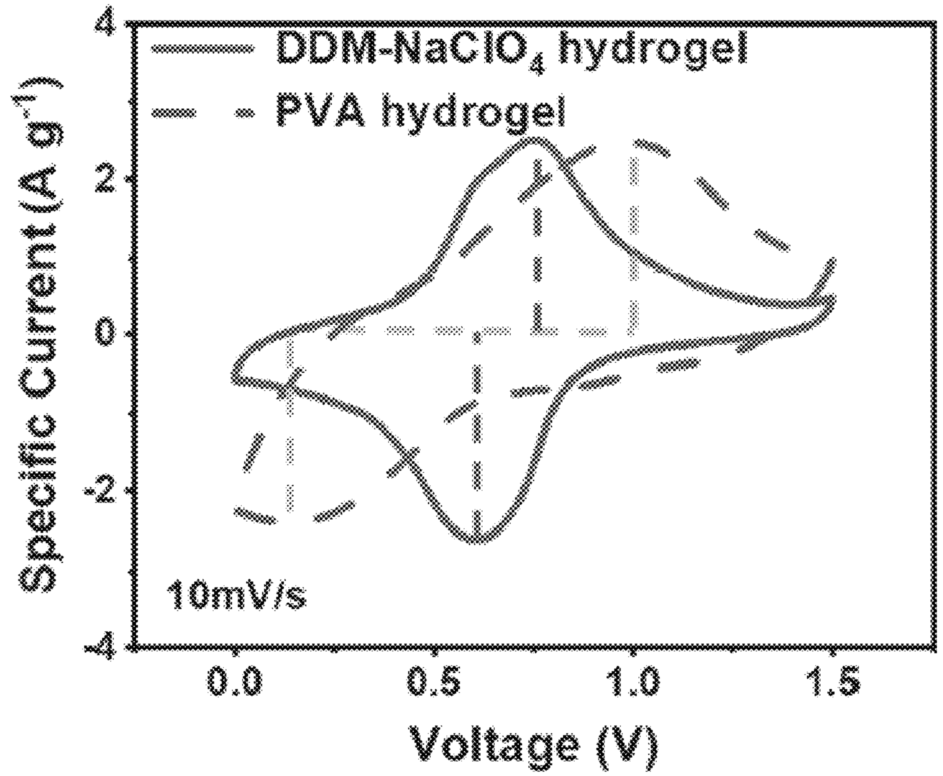
FIG. 11 is a graph showing a result of measuring a CV curve of each of the dextrin-DADMAC based double network polymer gel electrolyte prepared according to Example and PVA gel electrolyte.

FIG. 11 is a graph showing a result of measuring a CV curve of each of the dextrin-DADMAC based double network polymer gel electrolyte prepared according to Example and PVA gel electrolyte.

Referring to FIG. 11, the dextrin-DADMAC based double network polymer gel electrolyte prepared according to Example using an aqueous solvent exbibits superior kinetic performance than that of the PVA hybrid gel electrolyte. A distance of a reduction peak of the dextrin-DADMAC based double network polymer gel electrolyte is 0.12V, and that of the PVA polymer gel electrolyte is 0.76V.

Figure 12A:
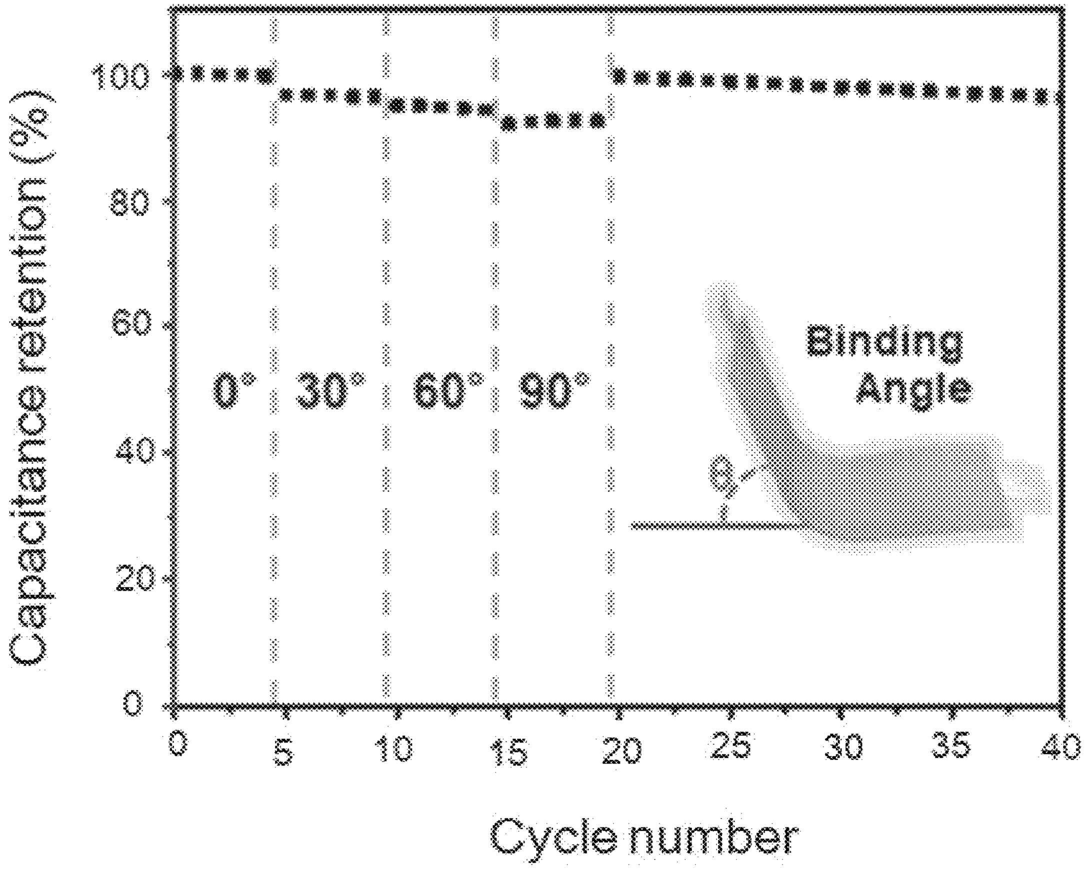
FIG. 12A and FIG. 12B show a result of measuring a CV based on a bending angle of each of the dextrin-DADMAC based double network polymer gel electrolyte prepared according to Example and the aqueous electrolyte containing $NaClO_4$ salt, and a result of measuring a capacitance retention based on the bending angle of each of the dextrin-DADMAC based double network polymer gel electrolyte prepared according to Example and the aqueous electrolyte containing $NaClO_4$ salt via GCD, respectively.
Figure 12B:
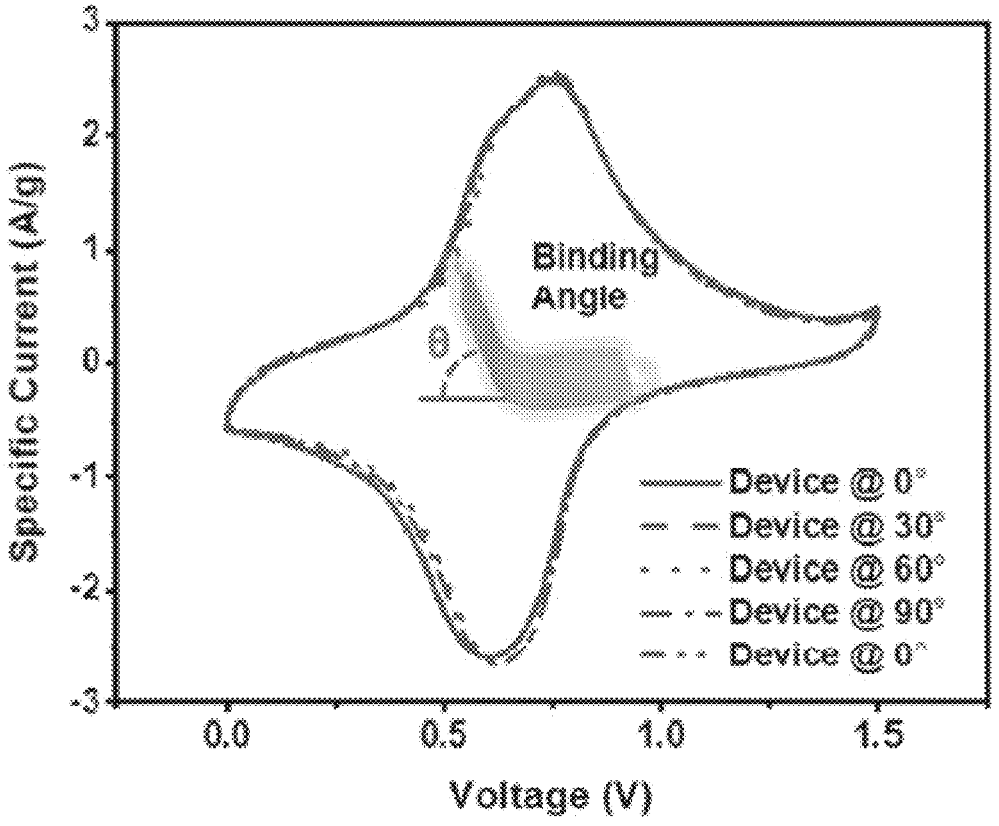

FIG. 12A and FIG. 12B show a result of measuring a CV based on a bending angle of each of the dextrin-DADMAC based double network polymer gel electrolyte prepared according to Example and the aqueous electrolyte containing $NaClO_4$ salt, and a result of measuring a capacitance retention based on the bending angle of each of the dextrin-DADMAC based double network polymer gel electrolyte prepared according to Example and the aqueous electrolyte containing $NaClO_4$ salt via GCD, respectively.

Referring to FIG. 12A, a flexible pouch cell is fabricated using the dextrin-DADMAC based double network polymer gel electrolyte prepared according to Example and is bent at a bending angle of each of 0°, 30°, 60°, and 90°. CV based on the bending angle was measured. Based on a result of the measurement, it is identified that substantially identical graphs are obtained at the bending angles of 0°, 30°, 60°, and 90°. Thus, the CV is not affected by the bending angle.

Referring to FIG. 12B, a flexible pouch cell is fabricated using the dextrin-DADMAC based double network polymer gel electrolyte prepared according to Example and is bent at a bending angle of each of 0°, 30°, 60°, and 90°. GCD based on the bending angle was measured. Based on a result of the measurement, it is identified that a surface area of an electrode decreases as the bending angle increases, and thus the capacity of the cell decreases. However, when the cell returns to its original state, the capacity thereof is almost identical to that before the bending.

Figure 13:
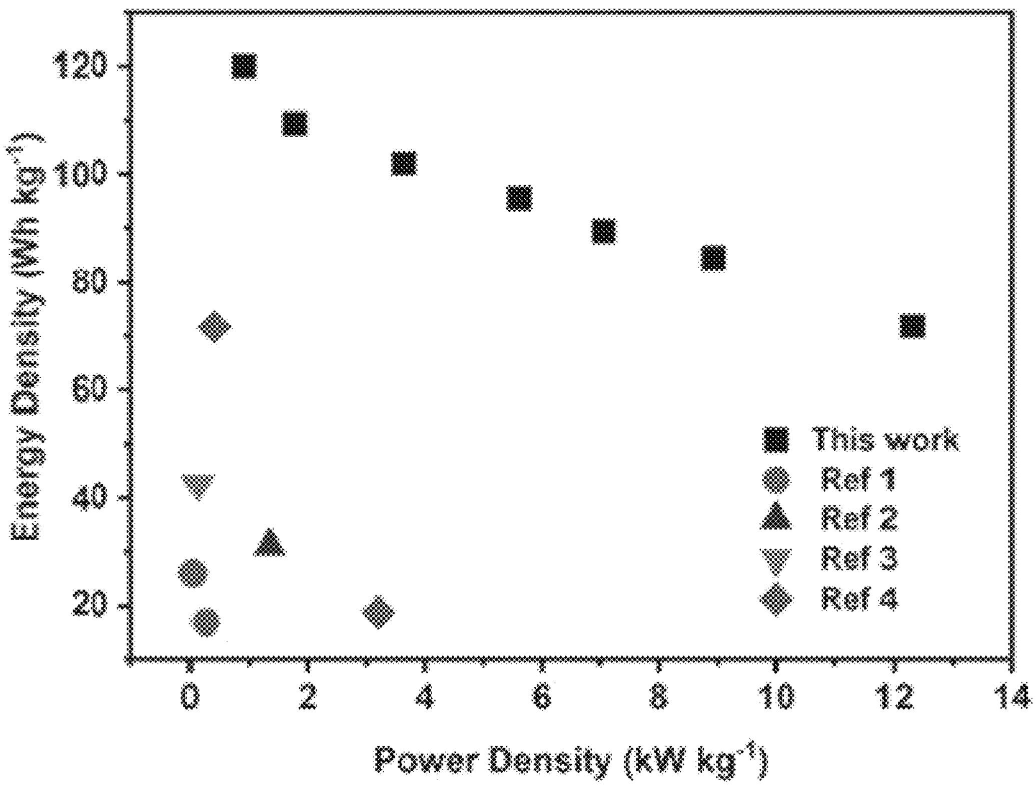
FIG. 13 is a graph showing energy density and power density measurement values of a sodium ion battery using the dextrin-DADMAC based double network polymer gel electrolyte prepared according to Example, and energy density and power density survey results of a sodium ion battery as previously researched.

FIG. 13 is a graph showing energy density and power density measurement values of a sodium ion battery using the dextrin-DADMAC based double network polymer gel electrolyte prepared according to Example, and energy density and power density survey results of a sodium ion battery as previously researched.

Referring to FIG. 13, based on the result of analyzing the energy density and the power density based on the rate capability of a sodium ion battery prepared using the dextrin-DADMAC based double network polymer gel electrolyte prepared according to Example, the sodium ion battery exhibits excellent power density 12.32 kW $kg^{-1}$ (at 71.85 W h $kg^{-1}$) and energy density 120.3 W h $kg^{-1}$ (at 0.906 kW $kg^{-1}$). Thus, the energy density and the power density of the battery to which the gel electrolyte prepared according to Example is applied are superior to the energy density and the power density of the previously studied sodium ion battery.

The descriptions of the presented embodiments have been provided so that a person of ordinary skill in the art of any the present disclosure may use or practice the present disclosure. Various modifications to these embodiments will be apparent to those skilled in the art of the present disclosure, and the general principles defined herein may be applied to other embodiments without departing from the scope of the present disclosure. Thus, the present disclosure is not intended to be limited to the embodiments presented herein, but is to be construed in the widest scope consistent with the principles and novel features presented herein.

What is claimed is:

1. A gel electrolyte comprising:

a first polymer network having a network structure in which linear main chains including diallyldimethylammonium chloride (DADMAC) monomers of a following Chemical Formula 1 are cross-linked with each other via N,N-methylenebisacrylamide of a following Chemical Formula 2;

a second polymer network including a dextrin polymer chain, and entangled with the first polymer network to form a double network composed of the first and second polymer networks; and a liquid electrolyte supported inside the double network composed of the first and second polymer networks:

[Chemical Formula 1]

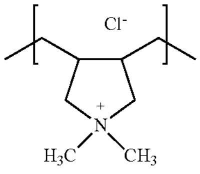

[Chemical Formula 2]

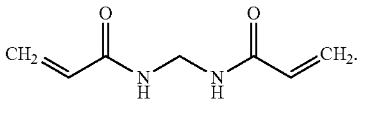

2. The gel electrolyte of claim 1, wherein the first polymer network includes a polymer network of a following Chemical Formula 3:

[Chemical Formula 3]

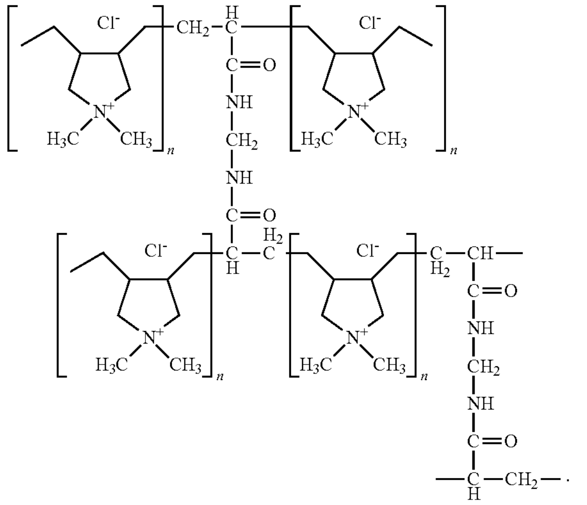

3. The gel electrolyte of claim 2, wherein the first polymer network has a number average molecular weight of about 7000 Da to 600000 Da.

4. The gel electrolyte of claim 3, wherein the dextrin polymer chain has a number average molecular weight of about 15000 Da to 30000 Da.

5. The gel electrolyte of claim 1, wherein a content of the second polymer network is in a range of about 1 to 15% by weight, based on a total weight of the first polymer network.

6. The gel electrolyte of claim 1, wherein a chain length of the second polymer network is larger than a chain length of the first polymer network.

7. A method for preparing the gel electrolyte of claim 1, the method comprising:

a first step of adding N,N-methylenebisacrylamide as a crosslinking agent and an initiator to an aqueous solution containing diallyldimethylammonium chloride (DADMAC) monomers to perform a radical reaction between some of the diallyldimethylammonium chloride monomers and a portion of the N,N-methylenebisacrylamide; and a second step of adding a dextrin polymer chain to the aqueous solution and then performing a radical reaction between a remainder of the diallyldimethylammonium chloride monomers and a remainder of the N,N-methylenebisacrylamide.

8. The method of claim 7, wherein in the first step, the diallyldimethylammonium chloride monomers are added at a content of about 100 mol to 110 mol, based on 1 mol of the N,N-methylenebisacrylamide.

9. The method of claim 8, wherein in the first step, a portion of a first polymer network, having a network structure in which linear main chains formed via polymerization of some of the diallyldimethylammonium chloride monomers are crosslinked with each other via the portion of the N,N-methylenebisacrylamide, is obtained.

10. The method of claim 9, wherein in the second step, the dextrin polymer chain is added to the aqueous solution at a content of about 1 to 15% by weight, based on a weight of the first polymer network.

11. The method of claim 10, wherein in the second step, in a process of mixing the portion of the first polymer network obtained in the first step with the dextrin polymer chain, an additional radical reaction between the remainder of the diallyldimethylammonium chloride monomers and the remainder of the N,N-methylenebisacrylamide occurs such that the dextrin polymer chain and the first polymer network are entangled with each other to form a double network.

12. The method of claim 7, wherein the radical reaction is carried out at a temperature of about 80° C. to 100° C.

13. The method of claim 7, wherein the method further comprises:

a third step of applying a reaction solution including a double network polymer resulting from the second step in a form of a film and then drying the applied reaction solution in the form of the film; and a fourth step of swelling a dried double network polymer in a form of a film using water to remove unreacted diallyldimethylammonium chloride monomers and unreacted N,N-methylenebisacrylamide as the cross-linking agent.

14. The method of claim 13, wherein the method further comprises a fifth step of impregnating the dried double network polymer in the form of the film with an aqueous solution containing a salt such that an ion exchange reaction between the salt and the double network polymer occurs to improve mechanical properties of the gel electrolyte.

15. An energy storage device comprising:

a first electrode and a second electrode facing each other and spaced from each other; and gel electrolyte disposed between the first electrode and the second electrode, wherein the gel electrolyte includes the gel electrolyte of claim 1.

16. The device of claim 15, wherein the energy storage device includes a supercapacitor or a secondary battery.

* * * * *